No. 639,140. Patented Dec. 12, 1899.
F. BOMMARIUS.
WATER FILTER.
(Application filed June 12, 1899.)

(No Model.)

Witnesses.
Robt Everitt

Inventor.
Frederick Bommarius.
By W. H. Cook
Atty.

THE NORRIS PETERS CO., PHOTO-LITHO., WASHINGTON, D. C.

UNITED STATES PATENT OFFICE.

FREDERICK BOMMARIUS, OF NEW ORLEANS, LOUISIANA.

WATER-FILTER.

SPECIFICATION forming part of Letters Patent No. 639,140, dated December 12, 1899.

Application filed June 12, 1899. Serial No. 720,217. (No model.)

*To all whom it may concern:*

Be it known that I, FREDERICK BOMMARIUS, a citizen of the United States, residing at New Orleans, in the parish of Orleans and State of Louisiana, have invented new and useful Improvements in Water-Filters, of which the following is a specification.

This invention relates to water-filters to be supplied direct from the water-pipes of a pressure system which will give a continuous flow of filtered water when required.

The invention consists in features of construction and novel combinations of parts in a filter of that character in which one or more tubular filter-bodies are rotatably supported within an outer shell or casing. The tubular filter-body may consist of any porous material, such as stone or unglazed earthenware, and the entire apparatus is provided with a suitable arrangement of pipes for controlling the supply of water to be filtered and discharge of the filtered water and for cleaning the apparatus when necessary.

Figure 1:
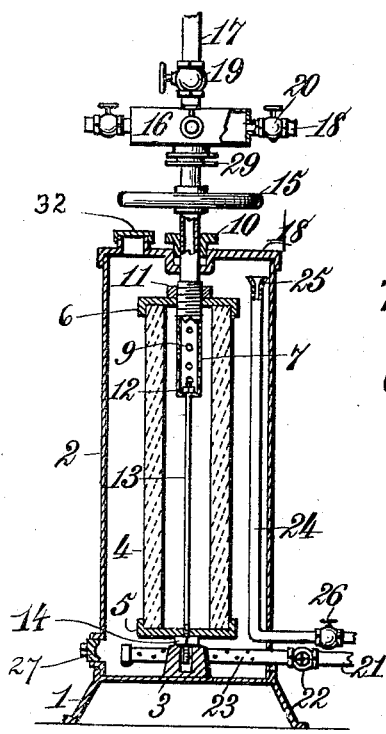
Figure 2:
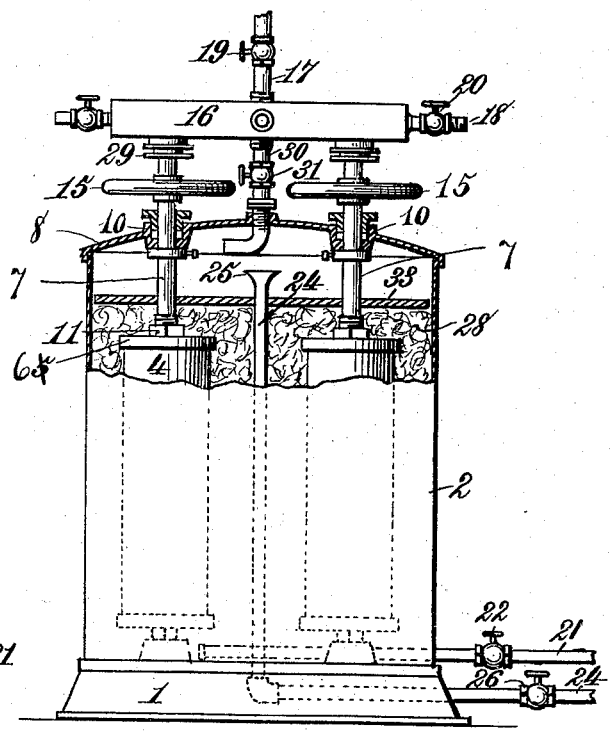

In the annexed drawings, Figure 1 is a sectional elevation of one form of my improved filter containing only a single rotatable tubular filter-body. Fig. 2 is a similar view of a form of filter in which several rotatable tubular filter-bodies are arranged.

The reference-numeral 1 designates a base or pedestal on which the outer shell or casing 2 is firmly supported. Within this casing there is a stand 3 for each tubular rotatable filter-body 4, composed of stone or other porous material. Each tubular filter-body is provided with a flanged cap 5 at its lower end and a similar cap 6 at its upper end firmly secured thereto. A pipe 7, which is screw-threaded about midway its length, is screwed through a central perforation in the upper cap 6, so as to depend partly within the tubular filter-body 4 at one end, while its other end is extended above said filter-body and through the upper end 8 of the outer shell or casing. That portion of the pipe 7 which depends within the tubular filter-body is provided with a series of perforations 9 for passage of water. A packing-box 10 surrounds the pipe 7 where it projects through the upper head of the filter-shell. On the pipe 7, immediately above the upper cap 6, there is a jam-nut 11 to assist in clamping said cap 6 onto the filter-body. In the lower end of the pipe 7 there is a nut 12, firmly secured to the upper end of a vertical rod 13, that is extended down through the lower cap 5, below which on said rod there is a nut 14, that may be tightened to clamp the caps 5 and 6 onto the opposite ends of the tubular filter-body through the medium of the pipe 7 and rod 13, as shown. On the pipe 7 above the filter-shell there is a hand-wheel 15, through which the tubular filter-body may be rotated in cleansing the filter. Above this hand-wheel the upper end of the vertical pipe 7 connects with a receiver 16 for filtered water. This filtered-water receiver may have any desired form and capacity and is connected with a pipe 17 at the top and may have any number of outlets 18 on its sides. The pipe 17 should connect with any suitable reservoir for filtered water. A valve 19 is located in the pipe 17 and valves 20 in the outlets. The filter is supplied with water from the pipes of a pressure system through an inlet-pipe 21, in which a valve 22 may be placed. This inlet-pipe 21 is extended into the lower part of the filter-shell and is provided with a series of perforations 23 for inlet of water to the filter. The water thus admitted will rise in the shell 2 outside the tubular porous filter-body and will gradually percolate through the same to its interior, rising therein to the depending perforated pipe 7 and entering this through its perforations will ascend to the filtered-water receiver, from which it may be drawn off for use as required. There is a waste-pipe 24 arranged vertically in the filter-shell. This pipe is extended to the upper part of the shell and may have a flaring top 25, as shown. In the lower part of the waste-pipe 24 outside the shell there is a valve 26, as shown. A plug or cap 27 is arranged in the lower part of the filter-shell to be removed for blowing out sand or other impurities. For the purpose of cleansing the filter the plug or cap 27 will be removed and a downward pressure of water from the filtered-water receiver 16 may be secured by opening the valve 19 and admitting water to said receiver from any suitable reservoir, as required. The water from the receiver 16 will descend through the pipe 7 and pass outwardly under pressure through the tubular porous filter-body 4 to its exterior, thereby removing stagnant impurities and cleaning the surface of said filter-body. Meanwhile the filter-body will be rotated through the hand-wheel 15 on the pipe 7, and, if desired, there may be a body of moss or other fibrous material 28 in the filter-shell outside the rotatable tubular filter-body and in contact therewith, so that as the filter-body is rotated its outer surface will be thoroughly cleansed.

As shown in Fig. 2, several rotatable tubular filter-bodies 4 may be arranged in the filter-shell. Each of these filter-bodies has a pipe 7 depending therein and connected above with the receiver 16 for filtered water. Packing-boxes 29 are provided where the pipe 7 connects with said receiver. Each of the pipes 7 is provided with a hand-wheel 15 for rotating the filter-bodies, as already explained. In this construction there is provided a pipe 30, depending from the filtered-water receiver 16 and entering the upper head 8 of the filter-shell. A valve 31 is arranged in this pipe, and on opening this valve there will be a pressure of water downward from the receiver 16 into the filter-shell, as required in cleansing the apparatus. The lower end of this pipe 30 may be curved to one side, as shown. A cap 32 is provided on the top of the filter-shell, at an opening through which water may be admitted for cleansing purposes.

The moss or other fibrous material 28 may be held down by plates 33 on the top of said material, so as to hold it compactly against the outer sides of the tubular filter-bodies.

The vertical rods 13, which assist in clamping the caps 5 and 6 in place, are extended down below the tubular filter-body 4 and are provided with bearings in the stands 3 at the bottom of the filter. These rods 13 serve, in conjunction with the pipes 7, as axles on which the tubular porous filter-bodies 4 can be easily rotated.

The construction of the filter is simple and comparatively inexpensive, and it can be readily kept in a cleanly and operative condition.

What I claim as my invention is—

1. A filter comprising an outer shell or casing, a tubular and porous filter-body rotatable in the filter shell or casing, flanged caps on the upper and lower ends of said rotatable filter-body, a pipe screwed into the upper cap and extended upwardly through the top of the filter-casing and downwardly into the rotatable filter-body, the depending portion of said pipe being provided with perforations within the rotatable filter-body, a receiver for filtered water connected with the upper end of said pipe and provided with valved inlets and outlets, a rod extended from the lower end of said pipe downwardly through the lower cap of the rotatable filter-body and having a bearing in the bottom of the filter-shell, fibrous material placed in the filter-casing around the porous filter-body, a pipe for inlet of water to the lower part of the filter-casing, and a waste-pipe, substantially as described.

2. In a filter, the combination of a filter-shell, a number of rotatable porous filter-bodies arranged in said shell, caps at the top and bottom of each tubular filter-body, pipes extended vertically through the top of the filter-shell and having perforated portions depending within each tubular filter-body, a receiver for filtered water connected with the said pipes at their upper ends, means for rotating each tubular filter-body, a pipe for inlet of water to the lower part of the filter-shell, and a waste-pipe, substantially as described.

3. In a filter, the combination of a filter-shell, one or more rotatable tubular porous filter-bodies arranged in said shell, fibrous material placed in the filter-shell around said tubular filter-bodies, plates pressing down on the top of said fibrous material, a vertical pipe extended through the top of the filter-shell and having a perforated portion in each tubular filter-body, a receiver for filtered water to which the upper end of each pipe is connected, means for rotating the tubular filter-bodies, a pipe for inlet of water to the lower part of the filter-shell, and a waste-pipe, substantially as described.

In testimony whereof I have hereunto set my hand in presence of two subscribing witnesses.

FREDERICK BOMMARIUS.

Witnesses:
  W. H. COOK,
  M. C. FORSTALL.